United States Patent
Wendt et al.

(10) Patent No.: US 10,042,403 B2
(45) Date of Patent: Aug. 7, 2018

(54) MANAGEMENT OF POWER-OVER-ETHERNET INSTALLATION

(75) Inventors: Matthias Wendt, Würselen (DE);
Joseph Hendrik Anna Maria Jacobs, Eygelshoven (NL); Peter Luerkens, Aachen (DE); Ulrich Boeke, Langerwehe (DE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 410 days.

(21) Appl. No.: 13/816,964

(22) PCT Filed: Aug. 10, 2011

(86) PCT No.: PCT/IB2011/053572
§ 371 (c)(1),
(2), (4) Date: Feb. 14, 2013

(87) PCT Pub. No.: WO2012/028981
PCT Pub. Date: Mar. 8, 2012

(65) Prior Publication Data
US 2013/0151025 A1   Jun. 13, 2013

(30) Foreign Application Priority Data

Aug. 30, 2010  (EP) ..................................... 10174542

(51) Int. Cl.
*G06F 1/26* (2006.01)
*H05B 33/08* (2006.01)
*H05B 37/02* (2006.01)
*G06F 1/32* (2006.01)

(52) U.S. Cl.
CPC .................. *G06F 1/26* (2013.01); *G06F 1/32* (2013.01); *H05B 33/0842* (2013.01); *H05B 37/0254* (2013.01); *H05B 37/0263* (2013.01)

(58) Field of Classification Search
None
See application file for complete search history.

(56) References Cited

U.S. PATENT DOCUMENTS

| 5,752,046 A * | 5/1998 | Oprescu ................... G06F 1/26 700/286 |
| 7,587,289 B1 | 9/2009 | Sivertsen |
| 8,457,793 B2 * | 6/2013 | Golding et al. .............. 700/275 |
| 8,731,689 B2 * | 5/2014 | Platner et al. .................. 700/22 |
| 8,902,049 B2 * | 12/2014 | Fushimi et al. ............ 340/12.22 |
| 2005/0125083 A1 * | 6/2005 | Kiko ............................... 700/19 |
| 2008/0201595 A1 * | 8/2008 | Kawasaki ............. G06F 1/3203 713/330 |

(Continued)

FOREIGN PATENT DOCUMENTS

| CN | 101047514 A | 10/2007 |
| CN | 101141263 A | 3/2008 |

(Continued)

*Primary Examiner* — Carlos Ortiz Rodriguez
(74) *Attorney, Agent, or Firm* — Meenakshy Chakravorty

(57) ABSTRACT

Described is a management unit (1) and a method for operating such a unit in a Power-over-Ethernet (PoE) installation. The management unit (1) comprises at least one first port (12a) to which an external device (2) can be connected, and it is adapted to control the power delivered at a first port (12a) in dependence on predetermined switching rules.

11 Claims, 1 Drawing Sheet

(56) References Cited

U.S. PATENT DOCUMENTS

| | | | |
|---|---|---|---|
| 2010/0026215 A1* | 2/2010 | Warton | 315/362 |
| 2010/0052421 A1* | 3/2010 | Schindler et al. | 307/35 |
| 2010/0141169 A1 | 6/2010 | Summerland et al. | |
| 2010/0321587 A1* | 12/2010 | Kerofsky | 348/730 |
| 2012/0271477 A1* | 10/2012 | Okubo et al. | 700/297 |

FOREIGN PATENT DOCUMENTS

| | | |
|---|---|---|
| CN | 101207290 A | 6/2008 |
| DE | 102006006140 A1 | 8/2007 |
| JP | 2008205678 A | 9/2008 |
| JP | 2010153100 A | 7/2010 |
| WO | 2008134433 A1 | 11/2008 |
| WO | 2009100762 A1 | 8/2009 |
| WO | 2010086757 A1 | 8/2010 |
| WO | 2011055284 A2 | 5/2011 |

* cited by examiner

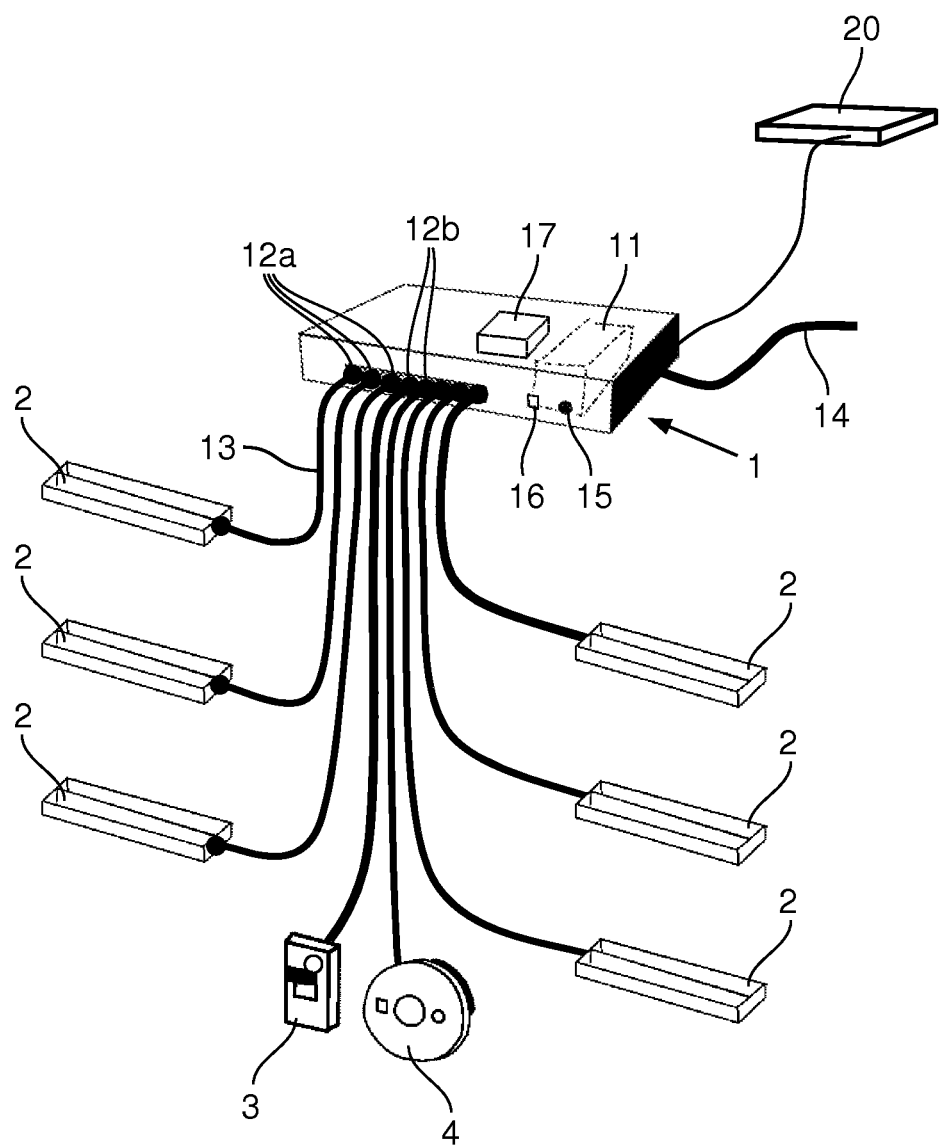

MANAGEMENT OF POWER-OVER-ETHERNET INSTALLATION

FIELD OF THE INVENTION

The invention relates to a method and a management unit for controlling a Power-over-Ethernet installation comprising at least two ports to which external devices can be connected.

BACKGROUND OF THE INVENTION

From the WO 2008/134433 A1, a Power-over-Ethernet (PoE) installation is known in which an Ethernet network comprises a computer and a plurality of light sources. The computer monitors the light sources and can switch them on an off.

SUMMARY OF THE INVENTION

Based on this background, it was an object of the present invention to provide means that allow for a more versatile control of devices in a PoE installation, particularly of lighting devices.

This object is achieved by a management unit according to claim 1 and a method according to claim 2. Preferred embodiments are disclosed in the dependent claims.

The management unit according to a first aspect of the present invention is intended for a Power-over-Ethernet (PoE) installation, i.e. a data communication network which is additionally provided with power transfer capabilities according to e.g. the standard IEEE 802.3.af (and/or higher or lower). The management unit comprises at least one "first" port to which external devices can be connected (these ports are dubbed "first ports" to distinguish them from other ports that will be introduced below for particular embodiments of the invention). Furthermore, the management unit is adapted to control the power delivered to an external device at such a first port in dependence on predetermined switching rules.

The switching rules may be programmed into the management unit permanently, or they may the programmed into some writable memory, e.g. via the Ethernet connection. They may particularly take the state of at least one external device connected to a first port into account, e.g. its actual power consumption, its maximal and/or minimal power demand, its type etc.

According to a second aspect, the invention relates to a method for operating a management unit in a PoE installation, said management unit comprising at least one first port to which external devices can be connected, wherein the power delivered to an external device at a first port is controlled in dependence on predetermined switching rules.

The described management unit and method have the advantage to increase the functionality of a PoE installation by allowing a flexible control over one or more external devices connected to the first port(s) of the management unit. This control is based on local rules that may for example take the actual state of at least one of the connected devices into account.

In the following, various preferred embodiments of the invention will be described that relate both to the management unit and the method described above.

The management unit may for example comprise at least one "second" port to which external devices can be connected, wherein the management unit is adapted to control the power delivered to an external device at a first port in dependence on the operational state of an external device connected to such a second port. Due to its particular function in this constellation, the external device at the second port will in the following be called "external controlling device". The external controlling device is hence enabled to execute, via the management unit, control over one or more other external devices connected to the second port(s) of the management unit. It may for instance be used to activate certain switching rules in which a plurality of external devices is affected and/or in which temporally extended procedures are executed with the external devices.

According to a first specific realization of the aforementioned embodiment, the external controlling device at the second port of the management unit is or comprises a switch, i.e. an electrical device which can (manually or automatically) be changed between two or more conductive states. Typically, the switch can assume just two states, "conductive" and "non-conductive" (interrupted). The switch may particularly be a usual light switch that can for example be operated by a user to turn external devices at the first port on or off.

In another embodiment of the invention, the external controlling device at the second port is or comprises a sensor, for example a light sensor, temperature sensor, humidity sensor, acoustic sensor or the like. With such a sensor, automatic systems can be designed in which the external devices at the first port are controlled in dependence on some physical state of the environment, for example the illumination level of a room.

In another optional embodiment of the invention, the management unit comprises a memory (e.g. RAM) in which track is kept of the connected external devices at the first and second port. Said memory may particularly be used to store characteristic parameters of the connected external devices. In this way a versatile control of power distribution is possible, providing for example each external device with an individual, optimal voltage or power.

The external devices that are or can be connected to the first port of the management unit may particularly comprise lamps, for example light emitting diodes (LEDs), phosphor converted LEDs, organic LEDs (OLEDs), LASERs, phosphor converted LASERs, colored fluorescent lamps, filtered (colored) halogen lamps, filtered (colored) high intensity discharge (HID) lamps, and/or filtered (colored) Ultra High Performance (UHP) lamps. By the incorporation of lamps, the PoE can favorably be used for lighting purposes. With a switch being connected to the second port of the management unit, such a system can be operated quite similar to the familiar standard lighting installations in houses.

According to a further development of the invention, the management unit can be put into a "power-low state" in which power consumption at at least one port is temporarily reduced. In a preferred embodiment of this concept, the management unit comprises a manual switch via which the power-low state can be initiated. A power-low state is particularly useful if the PoE installation comprises lamps or other components with a comparatively high power demand, because it allows an exchange of these components in a safe way without arcing and without the need to switch them completely off.

In general, both AC or DC voltage may be provided at the ports of the management unit. Most preferred and in line with the standard PoE is the provision of DC voltage.

According to another preferred embodiment of the invention, the management unit is adapted to control the external devices connected to it such that a given maximally allowed sum of power is not exceeded. Once the maximally allowed sum of power is approached, the management unit may either stop a further power increase at the ports and/or command the connected external devices to reduce their power consumption. In this way both a safe operation as well as a maximal functionality is achieved.

The aforementioned value of the maximally allowed sum of power is preferably communicated to the management unit from a hierarchically higher unit of an Internet Protocol (IP) network to which the management unit is connected. In this way an intelligent power distribution in a large Ethernet network can be realized.

The switching rules of the management unit may optionally comprise a list of priorities, i.e. a ranking of consumers (external devices) with respect to their importance. Such a list may for example be used in the above power management scenario, allowing the management unit without external intervention to reduce power consumption of less important devices.

The first and/or the second port(s) of the management unit are optionally operated with a protocol that includes an identification procedure for newly connected external devices. Protocols of this kind are usually part of the known PoE standards (e.g. IEEE 802.3.af). More particularly, the first and/or the second port(s) can be operated completely conformal to such a PoE standard. It should be noted, however, that this needs not necessarily be the case. Instead, it is a particular advantage of the present invention that also simple devices like conventional lamps can be connected to the management unit, because the latter comprises all the necessary control intelligence.

BRIEF DESCRIPTION OF THE DRAWINGS

These and other aspects of the invention will be apparent from and elucidated with reference to the embodiment(s) described hereinafter. These embodiments will be described by way of example with the help of the accompanying drawing in which:

FIG. 1 schematically illustrates a PoE installation with a management unit according to the present invention.

DESCRIPTION OF PREFERRED EMBODIMENTS

For efficiency optimization in power distribution in professional buildings a combined AC and DC distribution can be used. Especially where it comes to appliances that need data connectivity together with limited supply power the concept known as "Power-over-Ethernet" (PoE) comes into the view. PoE is an active standard (IEEE 802.3.af) which allows providing electrical energy to detached networked devices over their standard Ethernet cable connection. Here actual standardization is going to support power levels of above 50 W per Cat5 connection.

Though the PoE standard has been considered mostly for detached networking devices like routers, switches, printer spoolers etc., it can also be beneficially used for lighting installations. However, in "Lighting-over-Ethernet" (LoE) systems the circuitry inside of the lamps has to be designed for low cost and very low power consumption. For LoE applications it makes hence sense to have a number of lighting specific issues resolved in a central switching-module rather than in each and every lighting device. DC distribution at low voltages suffers from relatively high currents giving issues with arcing when switching and unplugging appliances or sub-grids under power. In addition the switching-module may have power supervisory functions supporting for example reduced power operation during night times or when power supply runs short for any reason (e.g. emergency supply in hospitals).

The solution proposed here is on specific PoE management units not only fulfilling the PoE standard IEE 802.3 but in addition having lighting specific power functions, for example:

a manual button on the management unit for preparing hot unplug to reduce arcing;
maximum power management;
lamps can ask for available power;
management unit knows about maximal power from next hierarchy supply;
if maximal power request would overload the supply, a lamp gets switched off or a dimming is commanded;
management unit knows about minimal light requirement and measured daylight for individual rooms;
special scenes can be predefined e.g. for emergency;
lamp switching rules can be kept in controller memory.

FIG. 1 sketches an exemplary PoE installation according to the above principles. Central device of this installation is the light management unit or box 1 providing power on the ports 12a, 12b (connectors). The management unit 1 gets power over a connection 14 that may directly be connected to mains. The light generation units or lamps 2 are connected via wires 13 to "first ports" 12a of the management unit 1. User interaction can happen in a first embodiment by means of a switching means 3 that is connected to one of the connectors, called "second port" 12b. In addition, sensing means 4 can support automatic action. These sensors 4 are also connected to one of the second ports 12b.

In a first embodiment the management unit 1 acts as Power Sourcing Equipment (PSE) and all the connectors 12a, 12b are PoE connectors. All connected external devices 2, 3, 4 are built to act as PoE Powered Devices (PD) and are minimally equipped with a communication controller able to talk to the Ethernet controller inside of the management unit 1. The management unit has a storage means keeping track of the devices connected and giving each device a unique address. Device properties like device-type (switch, sensing means, lighting unit, etc.) as well as the related power requirements are stored in the same table. An example of such a table is given below:

| Port | Device type | Min power when dimmed | Max power full on |
|------|-------------|-----------------------|-------------------|
| 1    | Lamp        | 5 W                   | 30 W              |
| 2    | Lamp        | 10 W                  | 45 W              |
| 3    | Switch      | 0                     | 0                 |
| ...  | ...         |                       |                   |
| n    | Lamp        | 5 W                   | 15 W              |
|      |             | Sum: 20 W             | Sum: 90 W         |

The management unit 1 further contains a power supply 11 that converts the power input into the output power at each connector 12a, 12b. This is in the first embodiment done following the standard of PoE (e.g. IEE 802.3). This standard requires from PoE Power Sourcing Equipment (PSE) to ensure that it does not apply 48 V to a non PoE enabled device. For this the PSE will initially apply a low voltage (2.7 V to 10.1 V) and look for a signature resistance of 25 K Ohms. The PSE will expect that the signature resistance will be after some form of auto-polarity circuit and will compensate for the DC offset in the signature. The maximum input capacitance of the Powered Device (PD) must be smaller than 150 nF.

A problem with an elevated power over DC connection is the arcing during unplug operation. In order to reduce the arcing stress on the connectors 12a, 12b of the management unit 1, a local button 15 is provided on the management unit 1 to reduce power on all lamp ports 12a to minimum for a fixed period ("power-low state"). During this period a signal lamp 16 at the management unit 1 might indicate rewiring mode. In such a way the lamps do not need to be totally switched off during reconfiguration or lamp exchange and rewiring can also take place in dark rooms with still some lamps on. The dim down can be executed by reducing the power level provided on the ports or by commanding dim mode to the lamp devices if these offer a dimming feature.

One important feature the software in the management unit 1 may provide is a means for predicting the power consumption of all lamps that are connected and comparing this with the maximally allowed power to be drained through power connection 14. Whenever the maximum power is a limiting factor, the lamps can be controlled to reduce their power request by means of a dimming command.

This can be especially useful if the system needs to go to a low consumption mode due to weak mains conditions or because supply is provided by a local generator or energy storage during mains down condition. The management unit 1 can directly manage the lamps to emergency operation. This may optionally be done according to a ranking list such that less important lamps are reduced or switched-off before lamps of higher importance.

As the management unit 1 preferably keeps track of all connected lamps 2, switches 3, and sensors 4, it is also possible to program switching rules into the management unit in a way that every switch can command certain changes in light. Predefined scenes can be stored in the management unit. The same holds for the sensing means 4.

Another feature of the management unit 1 is to power down the connectors 12a, 12b individually (as this is anyways a requirement for PoE switches which do only provide power on the ports after establishing power requirement exchange with the connected appliances).

Lamps 2 with minimal intelligence can be made that only request a certain power level but always burn whenever the related output port 12a is powered. The management unit 1 can for these kinds of attached devices directly control power up and down when the switching rules are requesting that. This allows lighting installations where the lamp devices are very simple and need only to convert input PoE supply voltage to required LED driving current. These can even be totally passive.

Similarly, switches 3 can be very simple (i.e. without μC or any complex digital logic) as these open the connection to the PoE port when off and simply reconnect and request a small current when switched on.

In a further developed system, lamp units and switching and sensing means can have some digital logic or microcontroller to really communicate via PoE and hence allow for more complex operation.

Programming of the management unit 1 memory 17 can be done by means of a computer (not shown) connected to one of the ports 12a, 12b and downloading the switching rules. The rules could also be preprogrammed and the plugs 12a, 12b have fixed behavior (e.g. connectors #2 to #4 are for lamps belonging to a group switched by a switch or sensor connected to connector #1 etc.).

In a further developed system the management unit 1 is not only connected to power via line 14 but also to an IP networking unit 20 one hierarchy level upwards. This allows for highly networked systems that can be centrally controlled or monitored in function. In this way maximum power to be available for the management unit 1 can also be communicated from the next higher level in the hierarchy. Thus hierarchical control over power consumption can be established. This behavior is a prerequisite to allow for peak power shaving without sacrificing minimum lighting conditions. For example, due to unstable mains grids, utilities may require a maximum peak power drawn. To deal with such a situation, control mechanisms called "peak power shaving" may be realized in a building which cut off peaks by e.g. compensation of power consumption variations with dynamically adjustable loads. Lamps may particularly help here because reduction of input power by 10% is virtually not visible.

In summary, the described invention relates to a lighting system comprising lamps, a management unit and switching or sensing means that use PoE standard connections to provide power. Optional features of this lighting system include:

The management unit keeps track of the connected devices.

The management unit allows also dumb devices to be connected that do not have an own intelligent control by means of a microprocessor.

The port power can be switched by switching rules that are related to other ports.

The current request of a switching device on one port gets interpreted as on command for the other ports where lamp devices are connected (distinguishable because of the higher power request at first connection).

The light control system keeps track on maximally allowed sum of power to be supplied into lighting devices and commanding these to control request down when a limit is reached.

The maximum power level is set by the power supply or fusing of the system.

The maximum power is communicated through the IP network from a central place.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. A power management unit for a Power-over-Ethernet installation, comprising:

the power management unit adapted to act as power sourcing equipment for a plurality of external devices and one or more external controlling devices, memory storing switching rules and information identifying each external device connected to the power management unit, the switching rules associating two or more non-zero power levels for each connected external device; and at least one first port to which the plurality of external devices can be connected, wherein the power management unit is adapted to transition power delivered at the first port between the two or more non-zero power levels in dependence on the stored switching rules, at least one second port to which the one or more external controlling devices can be connected, each of the at least one first and at least one second ports being Power-over-Ethernet ports providing power and data communication, the power management unit adapted to receive a control command from the one or more external controlling devices, based on an operational state of the one or more external controlling devices, via the at least one second port to execute the switching rules to transition power delivered at the at least one first port to one or more connected devices of the plurality of external devices, wherein the power management unit is adapted to detect if insufficient power is being provided to the power management unit and, in response to detection of insufficient power, to reduce power levels provided to the one or more connected devices of the plurality of external devices such that a given maximally allowed sum of power is not exceeded by transitioning power delivered at the at least one first port between the two or more non-zero power levels without turning off the one or more connected devices of the plurality of external devices.

2. The power management unit according to claim 1, wherein the external controlling device comprises a switch.

3. The power management unit according to claim 1, wherein the external controlling device comprises a sensor.

4. The power management unit according to claim 1, further wherein the memory further stores characteristic parameters of a plurality of connected external devices.

5. The power management unit according to claim 1, wherein the plurality of external devices at the at least one first port comprises a plurality of lamps.

6. The power management unit according to claim 1, wherein a DC voltage is provided at the first port.

7. The management unit according to claim 1, wherein the value of the maximally allowed sum of power is communicated from a hierarchically higher unit of an IP network the management unit is connected to.

8. The power management unit according to claim 1, further comprising:
memory storing switching rules, wherein the switching rules comprise a ranking of external devices.

9. A power management unit for a Power-over-Ethernet installation, comprising:
the power management unit adapted to act as power sourcing equipment for a plurality of external devices and one or more external controlling devices,
memory storing switching rules and information identifying each external device connected to the power management unit, the switching rules associating two or more non-zero power levels for each connected external device; and
at least one first port to which the plurality of external devices can be connected,
a manual switch for preparing hot unplug of the external devices from the at least one first port, such that arcing is reduced when one or more of the external devices is unplugged without first turning the external devices off, the manual switch configured to initiate a low-power state in which power consumption at the first port is reduced by transitioning power delivered at the at least one first port between the two or more non-zero power levels without turning off the plurality of external devices, at least one second port to which external controlling devices can be connected, each of the at least one first and at least one second ports being Power-over-Ethernet ports providing power and data communication, the power management unit adapted to receive a control command from the one or more external controlling devices, based on an operational state of the one or more external controlling devices, via the at least one second port to execute the switching rules to transition power delivered to the plurality of external devices at the first port between the two or more non-zero power levels.

10. A power management unit for a Power-over-Ethernet installation, comprising:
the power management unit adapted to act as power sourcing equipment, at least one first port to which external devices can be connected,
wherein the power management unit is adapted to transition the power delivered at the first port between two or more non-zero power levels in dependence on predetermined switching rules, wherein the power management unit is adapted to detect if insufficient power is being provided to the power management unit and to control a plurality of external devices connected to the management unit in response to detection of insufficient power by reducing power levels provided to the plurality of external devices such that a given maximally allowed sum of power is not exceeded by transitioning power delivered at the at least one first port between the two or more non-zero power levels without turning off the plurality of external devices;

at least one second port to which external controlling devices can be connected, each of the at least one first and at least one second ports being Power-over-Ethernet ports providing power and data communication, wherein the power management unit is adapted to receive a control command from the one or more external controlling devices, based on an operational state of the one or more external controlling devices, via the at least one second port to execute the switching rules to transition the power delivered to one or more of the plurality of external devices at the first port between the two or more non-zero power levels;

a memory for storing characteristic parameters of each external device of the plurality of external devices connected to the power management unit and the predetermined switching rules; and the characteristic parameters of the connected external devices includes a table of the external devices and a related power requirement for each of the external devices, which includes the two or more non-zero power levels associated with each of the external devices.

11. A power management unit adapted to act as Power Sourcing Equipment for a Power-over-Ethernet installation, comprising:
at least one first port to which lamps can be connected,
at least one second port to which one or more external controlling devices can be connected, each at least one first and at least one second port being a Power-over-Ethernet port providing power and data communication; and
memory storing predetermined switching rules and information identifying each lamp connected to the power management unit, the predetermined switching rules associating two or more non-zero power levels for each connected lamp;

wherein the power management unit is adapted to receive a control command from the one or more external controlling devices, based on an operational state of the one or more external controlling devices, via the at least one second port to execute the predetermined switching rules to control the power delivered at the at least one first port, and wherein the power management unit is adapted to control a plurality of external devices connected to the power management unit such that a given maximally allowed sum of power is not exceeded; and wherein the power management unit is adapted to detect if insufficient power is being provided to the power management unit and to execute a dim down of the lamps in response to detection of the insufficient power by reducing the power level provided on the at least one first port by transitioning power delivered at the at least one first port between the two or more non-zero power levels without turning off the lamps.

\* \* \* \* \*